United States Patent [19]

Wagner

[11] 4,032,804
[45] June 28, 1977

[54] ULTRASENSITIVE DIFFERENTIAL RELAY CONFIGURATION

[76] Inventor: Gilbert F. Wagner, 1709 Pebble Beach Drive, Vienna, Va. 22180

[22] Filed: June 22, 1976

[21] Appl. No.: 698,657

[52] U.S. Cl. .............................. 310/8.3; 310/8.2; 310/8.7; 200/85 R; 200/181
[51] Int. Cl.² ...................................... H01L 41/04
[58] Field of Search ................... 310/8.2, 8.3, 8.7; 317/81, DIG. 11; 200/153 V, 85 R, 181, DIG. 8, DIG. 20, DIG. 35; 340/65, 261, 164 A

[56] References Cited

UNITED STATES PATENTS

| | | | |
|---|---|---|---|
| 2,387,108 | 10/1945 | Arndt, Jr. et al. | 310/8.6 |
| 3,659,163 | 4/1972 | Borisov et al. | 200/181 |
| 3,858,173 | 12/1974 | Ryan | 200/85 R |

*Primary Examiner*—Mark O. Budd
*Attorney, Agent, or Firm*—Nathan Edelberg; Glenn S. Ovrevik

[57] ABSTRACT

Three different embodiments of the ultrasensitive differential point contact relay configuration of this invention are disclosed. The first or basic embodiment is particularly suited for use in intrusion detection systems or as a strain gauge/accelerometer and the like. The second embodiment is particularly suited for use as an ultrasensitive electrically actuated relay and the like. The third embodiment performs the function of an ultrasensitive strain gauge/accelerometer whose output is the mix of the mechanical and electrical stimulus. The basic embodiment comprises a point contact relay housed in a two section case or container. The two sections of the container are joined by a lower modulus section. A movable contact arm is spring biased against a second movable contact and the base of the contact arm floats in a viscous fluid. In the second embodiment the case or container is formed as one section and a piezoelectric crystal is mechanically coupled to the second contact. In the third embodiment the case or container is similar to the case or container of the basic embodiment and a pair of transducers are mechanically coupled to the second contact.

14 Claims, 3 Drawing Figures

ULTRASENSITIVE DIFFERENTIAL RELAY CONFIGURATION

The invention described herein may be manufactured, used, and licensed by or for the Government for Governmental purposes without the payment to me of any royalties thereon.

BACKGROUND OF THE INVENTION

This invention relates to strain gauges, accelerometers, relays, mixers and the like; and more particularly to an ultrasensitive relay configuration capable of performing the function of a strain gauge/accelerometer, mixer, a relay, a vibration sensor, an intrusion sensor and the like.

Point contact ultrasensitive differential relays potentially have wide applications in modern solid state electronics because such devices can be operated at the low voltage and low power levels present in such circuits. However, prior to this invention a fully satisfactory and highly reliable ultrasensitive point contact relay device had not been available in the art. This invention provides rugged ultrasensitive point contact relay configurations that have wide applications in modern solid state electronics and are highly reliable in operation.

SUMMARY OF THE INVENTION

Three embodiments of the invention are disclosed. The first or basic embodiment comprises a point contact type relay having a movable point contact arm and a stationary contact. The contact arm is held normally closed on the stationary contact by means of a spring which urges the point contact arm against the stationary contact. The point contact arm assembly floats in a viscous damping material. The point contact arm, the second contact, the spring and the viscous material are all housed in a two part container. The two parts of the container are joined together by a low modulus material. If one of the two parts of the container is secured in such a manner that this end can not move, and the other end is free to move, any force or pressure applied to the free end will cause this part of container to move toward the other part of the container due to the fact that the two parts are joined by a flexible material. When the force or pressure is removed, the free end will move back to its original position causing the relay contacts to momentarily separate thereby providing an indication that a force has been applied to the free end of the container or conversely that the force has been removed.

In the second embodiment the relay contact configuration is the same as the relay contact configuration of the first embodiment; however, in this embodiment the container is a one piece container made of a high modulus material and a piezoelectric or other conventional transducer is mechanically coupled to the relay contacts. Any voltage applied to the transducer will cause the transducer to change configuration thereby momentarily opening the normally closed relay contacts.

In the third embodiment, a second piezoelectric crystal or other mechanical transducer is mechanically coupled to the relay contacts and the container is similar to the container of the first embodiment.

BRIEF DESCRIPTION OF THE DRAWING

A full and complete understanding of the structural details and operation of the invention can be obtained from the following detailed description when read in conjunction with the annexed drawing in which.

DETAILED DESCRIPTION OF THE INVENTION

Figure 1:
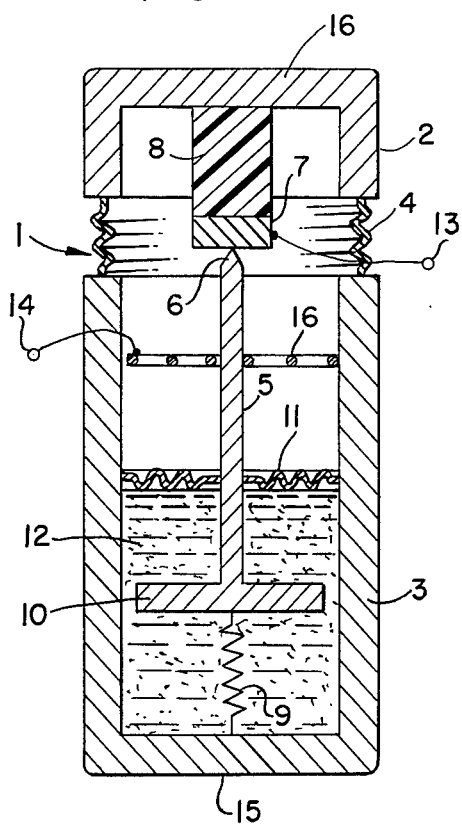
FIG. 1 is a cross-section view of a first embodiment of the invention.

Referring first to FIG. 1, this embodiment of the ultrasensitive relay configuration of the invention includes a housing or container 1 having a first section 2 and a second section 4 which is flexible and a third section 3. The sections 2 and 3 are joined together by flexible section 4 to form the closed housing or container 1. Housed inside container 1 is a moveable point contact arm assembly having the arm 5 and the point contact 6. A second contact 7 is secured to an insulating material 8 which in turn is secured to container 1 to hold contact 7 in place. Point contact 6 is normally closed on contact 7. A push spring 9 having one end fastened to container 1 and its other end fastened to the clamping disc 10 of point contact arm 5 urges point contact arm 5 toward contact 7 thereby holding point contact 6 normally closed on contact 7.

Point contact arm 5 passes through a flexible diaphram 11 provided inside container 1. As oriented in FIG. 1, damping disc 10 and a portion of point contact arm 5 remain below diaphram 11 while the balance of point contact arm 5 is above diaphram 11. A viscous fluid 12 is stored inside container 1 below diaphram 11. Flexible diaphram 11 forms a seal around point contact arm 5 to seal viscous fluid 12 in the part of container 1 shown in FIG. 1. The point contact arm assembly floats in viscous fluid 12 which, as will become apparent, serves as a damping medium.

In order to hold the point contact arm assembly in the erect position shown, a spider spring 16 is secured inside container 1. Point contact arm 5 passes through the center of spider spring 16 and is thereby held upright.

An electrical lead 13 is connected to spider spring 16 and brought out through container 1 and an electrical lead 14 is connected to point contact arm 5 and also brought out through container 1. Spider spring 16 is in electrical contact with contact arm 5.

While the embodiment of FIG. 1 has several different uses, this embodiment is particularly suited for use in an intrusion detection system. Thus, to describe the operation of the system of FIG. 1, it will be assumed that this embodiment has been incorporated in a detection system. In such a system, the relay configuration of FIG. 1 can be used to detect any force, strain or pressure applied to one end of container 1 or to detect the release of an applied force, strain or pressure. Typically, in an intrusion detection system, end 15 of container 1 would be secured while end 16 would be free to move. Thus, if the relay configuration of FIG. 1 is to be installed in an intrusion detection system that the presence of an intrusion is detected by the force, pressure, or strain applied to this relay configuration by an intrusion, the apparatus will be located such that one end, say end 15, is secured and the other end, end 16, is free to move toward end 15 under the stimulus of an intrusion. When end 16 is forced toward end 15, section 2 of container 1 moves toward section 3 thereby pushing the contact arm assembly toward end 15. When the contact arm assembly is forced toward end 15, spring 9 is compressed, the inner coils of spider spring 16 move downward toward end 15 and flexible diaphram 11 is flexed toward end 15. During this time point contact 6 remains closed on contact 7.

When the stimulus that caused section 2 to move toward section 3 is removed, section 2 will return to the position shown in FIG. 1; however, due to viscous fluid 12, the contact arm assembly will not move back to the position shown in FIG. 1 as quickly as section 2 returns. Thus, point contact 6 is momentarily separated from contact 7. The length of time the contacts are open depends upon the viscosity of fluid 12 and the return force applied by spring 9, by spider spring 16 and by flexible diaphram 11 relative to the time it takes section 2 to return to its original position. If a voltage is applied across leads 13 and 14, current will fow when contacts 6 and 7 are closed and when contacts 6 and 7 are momentarily opened, this current flow will momentarily cease. Thus, the application of the force, strain or pressure and the subsequent release thereof is detected by the momentary cut-off of current flow.

Since the pressure, force or strain that caused section 2 to move toward section 3 has to be released to detect the such an event has taken place, it should be obvious that the embodiment of FIG. 1 can also be used to detect the release of a force of pressure. For example, the embodiment of FIG. 1 can be so installed in an intrusion detection system such that section 2 is normally moved toward section 3 by, for example, the closing of a window or door. If the window or door is then opened, section 2 will return to the position shown in FIG. 1 and as described above contacts 6 and 7 will momentarily open. Thus, the relay configuration of FIG. 1 can be used in an intrusion detection system to detect either the application or the release of force, pressure or strain and, as should be obvious, can be in any other system where force/pressure/strain application or release detection is desired.

Figure 2:
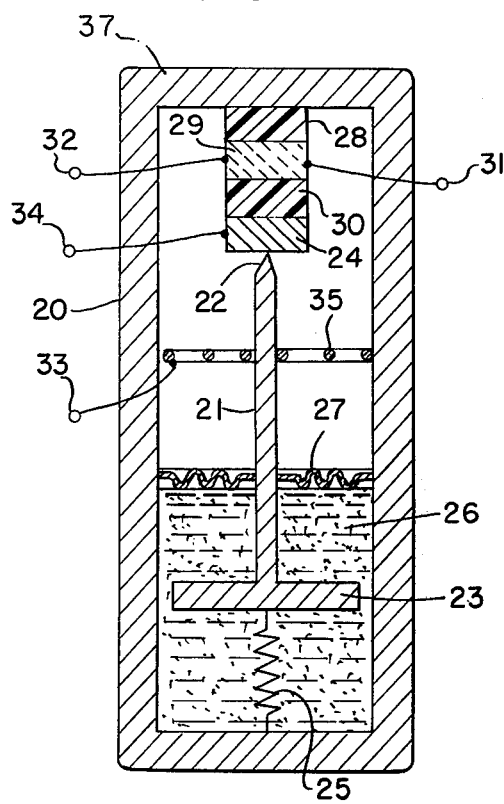
FIG. 2 is a cross-section view of a second embodiment of the invention.

In the second embodiment of the invention, shown in cross-section in FIG. 2, the container 20 is not sectioned as is container 1 in FIG. 1. However, the basic relay configuration in FIG. 2 is identical to the configuration shown in FIG. 1. Thus, a point contact assembly having an arm 21, a point contact 22 and a damping disc 23, and a second contact 24 are provided inside container 20. A spring 25 urges point contact 22 closed on contact 24 an the point contact assembly floats in a viscous fluid 26. A flexible diaphram 27 through which arm 21 passes is provided to retain viscous fluid 26 in the part of container 20 in which it is shown in FIG. 2. A spider spring 35 is provided to hold the point contact assembly upright.

A first insulator 28 has one side secured to the inside of container 20 and its other side secured to a transducer 29 which may, for example, be a piezoelectric crystal. A second insulator 30 has one side secured to transducer 29 and its other side secured to contact 24. A pair of electrical leads 31 and 32 are connected to transducer 29 and brought out through container 20. An electrical lead 33 brought out through container 20 is connected to spider spring 35 which is in electrical contact with arm 21 and an electrical lead 34, also brought out through container 20 is connected to contact 24.

While this second embodiment can be used for various different purposes, it is particularly suited for use as a relay. When used as a relay, the relay is a normally closed relay. To open the relay, a voltage is applied to transducer 29 causing transducer 29 to be strained. When transducer 29 is strained, a downward force is applied to contact 24 and thus on point contact 22. Under the influence of this force, the contact arm assembly will momentarily move away from contact 24, thereby opening contacts 22 and 24. The length of time that the contacts remain open depends on the force applied, the return force of spring 25, spider spring 35, flexible diaphram 27, and the viscosity of liquid 26. If transducer 29 is vibrated, the contacts will repeatedly open and close, and conversely, if transducer 29 is not strained, contacts 22 and 24 will remain closed. If a voltage is applied across leads 33 and 34, the opening and closing of contacts 22 and 24 can be readily detected.

While the FIG. 2 embodiment is particularly suited for use as a relay, this configuration can also be used as a pressure measuring device by a slight modification. End 37 of container could be replaced by a diaphram which would transmit any pressure applied to the diaphram to transducer 29 thereby generating an electrical current. Note also that when the pressure is removed, contacts 22 and 24 would open momentarily in the manner described above with reference to the FIG. 1 embodiment.

Figure 3:
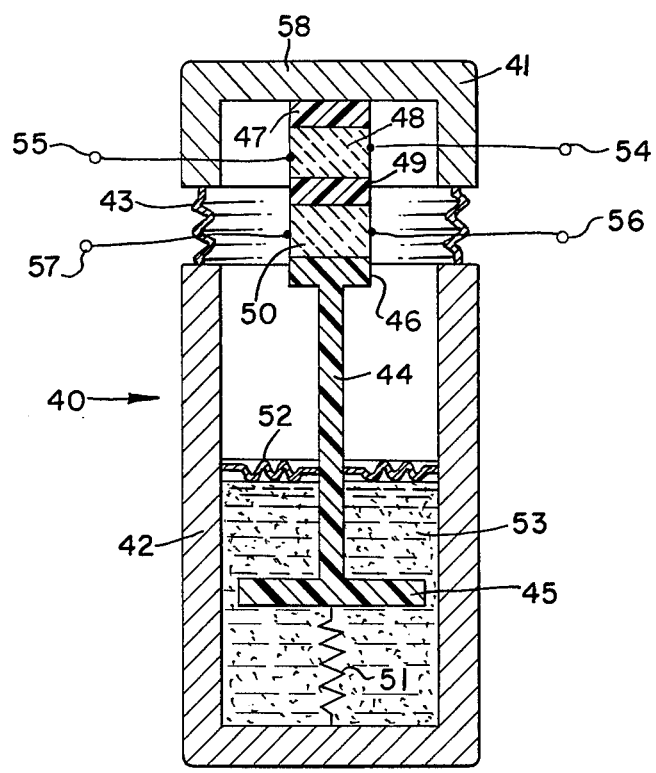
FIG. 3 is a cross-section view of a third embodiment of the invention.

The third embodiment, shown in cross-section in FIG. 3, is housed in a container 40 essentially identical to container 1 of FIG. 1. Thus, container 40 comprises a first section 41 and a second section 42 joined together by a flexible material 43. A contact arm assembly having an arm 44, a damping disc 45 at one end of arm 44 and an end face 46 at the other end of arm 44 is housed inside container 40. The contact arm assembly may be made of any suitable non-conductive or conductive material. A first block of insulating material 47 has one side secured to the inside of container 40 and its other side secured to a first transducer 48 which may, for example, be a piezoelectric crystal. A second block of insulating material has one side secured to transducer 48 and its other side secured to a second transducer 50 which may also be a piezoelectric crystal. The face of transducer 50 opposite the face to which insulator block 49 is secured contacts end face 46. End face 46 is biased into contact with transducer 50 by means of the spring 51 which is connected between damping disc 45 and the inside of container 40. A flexible diaphram 52 through which moveable arm 44 passes is provided inside container 40 to retain the viscous fluid 53 in the area of container 40 in which it is shown in FIG. 3. A pair of electrical leads 54 and 55 brought out through container 40 are connected to transducer 48 and a second pair of electrical conductors 56 and 57, also brought out through container 40, are connected to transducer 50.

A spider spring such as the spider spring 16 of FIG. 1 and the spider spring 35 of FIG. 2 is not shown in the FIG. 3 embodiment. If end face 46 is secured to transducer 50 such a spring is not necessary; however, if end face 46 is free to move off of transducer 50, such a spider spring will have to be provided.

In the following description of the operation of this third embodiment it is assumed that the device is operating as a mixer of electrical signals with mechanical force/strain vibration stimuli. However, this embodiment can also perform as a strain gauge and the like. Assuming the device of FIG. 3 is performing as a mixer, a voltage is applied to transducer 48 by means of the electrical leads 54 and 55. This voltage will cause transducer 48 to vibrate. These vibrations are transmitted to transducer 50 via insulator block 49. If a force is applied to the end 58 of section 41, section 41 will be forced toward section 42, assuming that section 42 is secured. This force will be transmitted to both transducers 48 and 50 with transducer 50 being subjected to both the vibration force due to the voltage applied to transducer 48 and the force applied to section 41 of container 40. Therefore, the output voltage appearing across electrical leads 56 and 57 will reflect a mixing of these forces. When the force is removed from end 58, transducer 50 will then only be under the influence of the vibrational forces from transducer 49.

When the force is removed from end 58, section 41 returns to its normal position as shown in FIG. 3. Due to the damping effect of viscous fluid 53, end face 46 may momentarily be out of contact with transducer 50. If end face 46 is secured to transducer 50 or if the force is such that end face 46 does not come out of contact with transducer 52, the apparatus operates as a linear mixer. If end face 46 is not secured to transducer 50 and comes out of contact with transducer 50, the apparatus operates as a non-linear mixer. Note in place of end face 46 a point contact could be provided if end face 46 is not to be secured to transducer 50.

While the invention has been described with reference to specific embodiments, it will be apparent to those skilled in the art that various changes and modifications can be made to the embodiments shown and described without departing from the spirit and scope of the invention as defined in the claims.

I claim:
1. An ultrasensitive relay configuration comprising:
a relay container having a first end and a second end;
a contact secured to said first end of said container inside said container;
a contact arm housed inside said container, said contact arm having a first end and a second end;
a damping disc secured to said second end of said contact arm;
a spring having a first end secured to said damping disc and a second end secured to said second end of said container inside said container, said spring urging said first end of said contact arm into contact with said contact;
a viscous fluid stored in said container adjacent said second end of said container, said viscous fluid surrounding said spring, said damping disc and a portion of said contact arm between said damping disc and said first end of said contact arm; and
a flexible diaphragm secured inside said container, said flexible diaphragm surrounding said contact arm above the level of said viscous fluid and sealing said viscous fluid in the area of said container adjacent said second end of said container.

2. The ultrasensitive relay configuration as defined in claim 1 wherein a spider spring is secured inside said container, said spider spring surrounding said contact arm and being in electrical contact with said contact arm, said spider spring being located between said flexible diaphragm and said first end of said contact arm.

3. The ultrasensitive relay configuration as defined in claim 2 wherein said first end of said contact arm is formed into a point and said point is biased into contact with said contact by said spring.

4. The ultrasensitive relay configuration as defined in claim 3 wherein a first electrical lead is connected to said spider spring and brought out through said container and a second electrical lead is connected to said contact and brought through said container.

5. The ultrasensitive relay configuration as defined in claim 4 wherein said container is fabricated into two sections and said two sections are joined together by a resilient member to form a closed container.

6. The ultrasensitive relay configuration as defined in claim 4 wherein said container is a closed container.

7. The ultrasensitive relay configuration as defined in claim 6 wherein a transducer is mechanically coupled to said contact and wherein a third electrical lead is connected to said transducer and a fourth electrical lead is connected to said transducer, said third and fourth electrical leads both being brought out through said container.

8. The ultrasensitive relay configuration as defined in claim 1 wherein said moveable contact arm has a contact face formed across said first end and said container is fabricated into two sections joined together by a resilient member to form a closed container.

9. The ultrasensitive relay configuration as defined in claim 8 wherein said contact is a first transducer.

10. The ultrasensitive relay configuration as defined in claim 9 wherein a second transducer is mechanically coupled to said first transducer.

11. The ultrasensitive relay configuration as defined in claim 10 wherein a first electrical lead and a second electrical lead are connected to said first transducer and a third electrical lead and a fourth electrical lead are connected to said second transducer, said first, second, third and fourth electrical lead all being brought out through said container.

12. The ultrasensitive relay configuration as defined in claim 11 wherein a spider spring is housed inside said container, said spider spring surrounding said contact arm and being located between said flexible diaphragm and said first end of said contact arm.

13. The ultrasensitive relay configuration as defined in claim 12 wherein said first end of said contact arm is formed into a point and said point is biased into contact with said first transducer.

14. The ultrasensitive relay configuration as defined in claim 11 wherein said contact face formed on said first end of said contact arm is secured to said first transducer.

* * * * *